United States Patent
Takano

(10) Patent No.: US 8,150,571 B2
(45) Date of Patent: Apr. 3, 2012

(54) BRAKING FORCE CORRECTING METHOD FOR ELECTRIC GOLF CAR AND ELECTRIC GOLF CAR EMPLOYING THE CORRECTING METHOD

(75) Inventor: Yukiyasu Takano, Shizuoka-ken (JP)

(73) Assignee: Yamaha Motor Electronics Kabushiki Kaisha, Shizuoka (JP)

( * ) Notice: Subject to any disclaimer, the term of this patent is extended or adjusted under 35 U.S.C. 154(b) by 1010 days.

(21) Appl. No.: 12/059,276

(22) Filed: Mar. 31, 2008

(65) Prior Publication Data

US 2008/0249676 A1 Oct. 9, 2008

(30) Foreign Application Priority Data

Apr. 6, 2007 (JP) ................................. 2007-100545

(51) Int. Cl.
G06F 19/00 (2006.01)
B60L 11/00 (2006.01)

(52) U.S. Cl. ......... 701/22; 303/152; 180/65.1; 318/376; 903/947

(58) Field of Classification Search .................. None
See application file for complete search history.

(56) References Cited

U.S. PATENT DOCUMENTS

| 5,839,800 A * | 11/1998 | Koga et al. | 303/152 |
| 6,292,753 B1 * | 9/2001 | Sugimoto et al. | 701/301 |
| 2004/0046652 A1 * | 3/2004 | Yokoyama et al. | 340/454 |
| 2004/0054450 A1 * | 3/2004 | Nakamura et al. | 701/22 |
| 2008/0224842 A1 * | 9/2008 | Takano | 340/454 |

FOREIGN PATENT DOCUMENTS

JP 2003-200821 7/2003

* cited by examiner

*Primary Examiner* — Thomas Black
*Assistant Examiner* — Lin B Olsen
(74) *Attorney, Agent, or Firm* — Keating & Bennett, LLP

(57) ABSTRACT

If a user applies a brake system while an electric vehicle that includes a battery is moving and it is confirmed that the user is not simultaneously applying the accelerator, a comparison is made between an actual deceleration and an expected deceleration corresponding to the user demand sensed by the braking system. If the actual deceleration is lower than the expected deceleration, an amount of regenerative electric current supplied to the battery is increased to better correlate the expected deceleration and the actual deceleration.

4 Claims, 2 Drawing Sheets

BRAKING FORCE CORRECTING METHOD FOR ELECTRIC GOLF CAR AND ELECTRIC GOLF CAR EMPLOYING THE CORRECTING METHOD

CROSS-REFERENCE TO RELATED APPLICATIONS

This application claims the priority benefit of Japanese Patent Application No. 2007-100545, which was filed on Apr. 6, 2007 and which is hereby incorporated by reference in its entirety.

BACKGROUND OF THE INVENTION

1. Field of the Invention

The present invention relates to a method by which actual deceleration of an electric golf car can be corrected to attain an expected deceleration when the actual deceleration experienced during braking does not match the anticipated braking performance.

2. Description of the Related Art

Electric golf cars typically include both a mechanical brake and an electric brake. The mechanical brake operates to control movement of the associated car in accordance with input through a brake pedal or the like. The electric brake decelerates the associated car through regenerative electric current generated when an accelerator pedal is released. JP-A-2003-200821 discloses a golf car including these two braking mechanisms. JP-A-2003-200821 employs a simple construction that uses the electric brake when there is an abnormality detected in the mechanical brake during operation.

SUMMARY OF THE INVENTION

However, the brake mechanisms in JP-A-2003-200821 do not compensate for brake wear that occurs over time. Instead, the configuration disclosed therein only distinguishes between a normal braking situation and an abnormal braking situation. Thus, if brake wear decreases the efficacy of the brakes to a degree less than a degree that signifies an abnormality in the braking system, the disclosed system did not compensate for the decreased effectiveness of the mechanical braking system with the electrical system.

Usually a golf course maintains a large number of golf cars. On a daily basis, several different users use the golf cars. Another way of viewing the situation is that a single user is not likely to use the same golf car on a sufficiently periodic basis to notice deterioration in braking performance. Moreover, because a single user is likely to use different golf cars on each visit, it is preferred that brake efficacy be as similar as possible among each of a large number of the golf cars. In other words, it is preferable that all golf cars in a single fleet have generally uniform braking forces. With golf cars constructed in accordance with the brake mechanisms disclosed in JP-A-2003-200821, braking forces will not be uniform over a fleet of golf cars.

Certain features, aspects and advantages of an embodiment of the present invention are designed to correct a braking force in an electric golf car such that the mechanical brake system and the electrical brake system can cooperate to optimize deceleration through correcting a braking force and, therefore, to provide an optimally comfortable ride.

One aspect of some embodiments of the present invention involves a braking force correcting method for an electric golf car comprising a battery. The method comprises: checking an accelerator opening to determine if an accelerator opening is substantially zero; detecting a speed of the golf car and obtaining an actual deceleration; detecting a demand level for brake application and obtaining an expected deceleration at the detected demand level; and, if the accelerator opening is determined to be substantially zero, a comparison is made between the obtained actual deceleration and the obtained expected deceleration, and if the obtained actual deceleration is lower than the obtained expected deceleration, an amount of regenerative electric current supplied to the battery is increased so that the actual deceleration increases toward the obtained expected deceleration.

BRIEF DESCRIPTION OF THE DRAWINGS

These and other features, aspects and advantages of the present invention will now be described with reference to the drawings of a preferred embodiment, which embodiment is intended to illustrate and not to limit the invention, and in which figures.

DETAILED DESCRIPTION OF THE PREFERRED EMBODIMENT

Certain features, aspects and advantages of some embodiments of the present invention relate to a method for correcting a braking force experienced in an electric golf car. The method typically is employed when a user applies the brakes during operation of an electric vehicle, which electric vehicle comprises a battery. As mentioned above, the electric vehicle preferably is a golf car. Some embodiments of the method involve checking to see if an accelerator opening, or operator demand on the motor, is zero; computing an actual deceleration by detecting a speed of the vehicle and obtaining the actual deceleration; and computing an expected deceleration by detecting a load applied to a brake pedal and obtaining the expected deceleration at the detected pedal effort such that a comparison can be made between the actual deceleration and the expected deceleration. Some embodiments also provide that, when the actual deceleration is lower than the expected deceleration, more regenerative electric current is supplied to the battery until the actual deceleration more closely correlates with the expected deceleration. Thus, improved braking operation results from most embodiments of the present invention.

Figure 1:
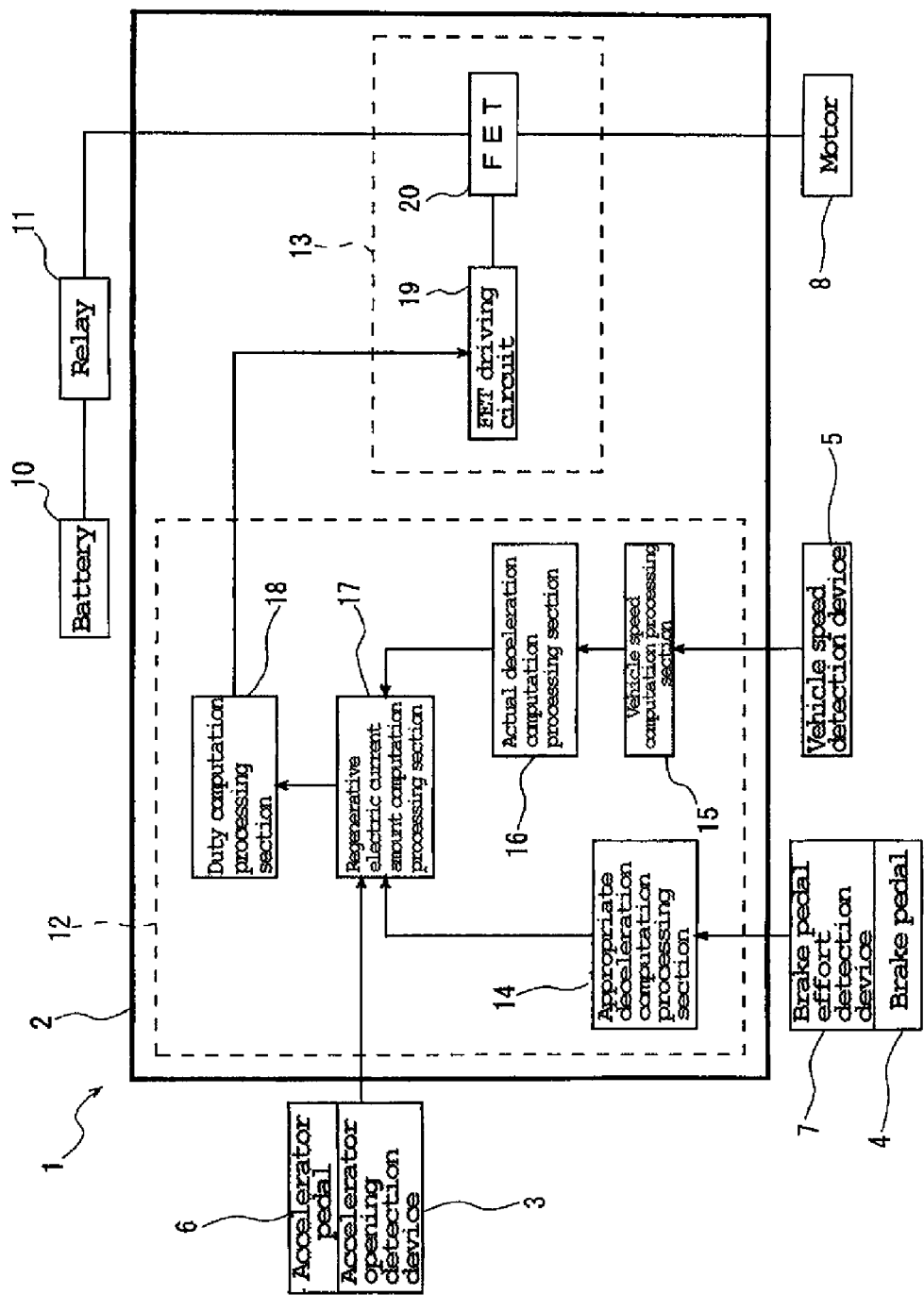
FIG. 1 is a schematic diagram showing an embodiment of a golf car that is arranged and configured in accordance with certain features, aspects and advantages of the present invention.

With reference to FIG. 1, a golf car 1 is shown schematically therein. The golf car 1 preferably is arranged and configured in accordance with certain features, aspects and advantages of certain embodiments of the present invention. The illustrated golf car 1 preferably comprises a motor controller unit (MCU) 2, a battery 10, and a motor 8. The illustrated MCU 2 is connected to an accelerator opening detection device 3, a brake pedal effort detection device 4, and a vehicle speed detection device 5. The accelerator opening detection device 3 can detect an angle to which a user depresses an accelerator pedal 6. Other configurations and techniques for determining operator demand also can be used. The brake pedal effort detection device 4 detects a pedal effort of, or a load exerted by, a user on a brake pedal 7. Other proxies also can be used for determining operator demands on the braking system. The vehicle speed detection device 5 can be an encoder that detects revolutions of a rear wheel (not shown) of the golf car 1, for example. The detected revolutions can be encoded into a pulse signal. Other techniques also can be used for detecting the actual vehicle speed or the actual change in speed being experienced by the vehicle.

The illustrated MCU 2 preferably comprises a microcomputer 12 and a motor driving circuit 13. The microcomputer 12 preferably is constructed with an expected deceleration computation processing section 14, a vehicle speed computation processing section 15, an actual deceleration computation processing section 16, a regenerative electric current amount computation processing section 17, and a duty computation processing section 18. The motor driving circuit 13 can comprise an FET driving circuit 19 and an FET (field effect transistor) 20.

When a user operates the golf car 1, an angle of the accelerator pedal 6 can be input to the MCU 2. The MCU 2 preferably drives the motor 8 such that the golf car 1 can operate at a speed that generally corresponds with the detected angle of the accelerator pedal 6. At this point, electric power is supplied from the battery 10 to the motor 8 via a relay 11, for example. Thus, the golf car 1 operates through the drive power of the motor 8. A voltage is applied to a gate of the FET 20 in this state. Preferably, the relay 11 is connected to a main switch of the golf car 1.

The golf car preferably decelerates when the brake pedal 7 is depressed. A pulse signal from the vehicle speed detection device 5 can be input to the vehicle speed computation processing section 15. Thereafter, the actual deceleration computation processing section 16 calculates the actual deceleration based upon a traveling speed before the brake pedal 4 is depressed and a traveling speed a certain period after braking has begun.

Meanwhile, when the brake pedal 7 is depressed, the brake pedal effort detection device 7 detects a load applied to the brake pedal. The expected deceleration computation processing section 14 calculates the expected deceleration of the golf car (i.e., the vehicle) 1 at the detected pedal effort or load. The expected deceleration is an expected deceleration value of the vehicle corresponding to the load applied to the brake, which can be detected by an amount of movement of the brake in some embodiments, and the deceleration of the vehicle 1 during braking when the brake has no significant wear or other significant abnormality. The expected deceleration may change depending on a slope of a road. Therefore, the expected deceleration may be obtained in consideration of the slope by using an incline sensor, and the like.

The actual deceleration and the expected deceleration are input from the respective processing parts 14, 16 to the regenerative electric current amount computation processing section 17. A comparison then is made the deceleration values and an amount of regenerative electric current required to bring the actual deceleration into line with the expected deceleration is computed. For example, if the actual deceleration is lower than the expected deceleration, then it is determined that the mechanical brake is less effective and that the brake is wearing. An amount of regenerative electric current required to correct a braking force then can be computed. Preferably, the determination is made while it is confirmed that the accelerator pedal 6 is not being depressed (i.e., an accelerator opening is zero).

When a required amount of regenerative electric current is determined, the duty computation processing part controls the FET 20 via the FET driving circuit 19 to control the amount of regenerative electric current. Specifically, an amount of regenerative electric current supplied from the motor 8 to the battery 10 is adjusted by controlling the duty cycle. Turning ON or OFF a voltage applied to the gate of the FET 20 can be controlled by the FET driving circuit 19 such that the duty cycle can be controlled. For example, if an amount of regenerative electric current supplied to the battery 10 should be increased, a period (duty ratio) that the voltage is applied to the gate of the FET 20 is increased.

An electric type brake with use of regenerative electric current generally cannot obtain a braking force for the vehicle 1 unless regenerative electric current flows to the battery 10. Therefore, if an amount of regenerative electric current supplied to the battery 10 is increased, more braking force can be obtained corresponding to the increase in the regenerative electric current. On the contrary, if an amount of regenerative electric current supplied to the battery 10 is decreased, a braking force is decreased.

Thereby, since an amount of regenerative electric current is adjusted and thereby a braking force can be supplemented, the actual deceleration can more closely correspond with the expected deceleration corresponding to a degree to which the brake pedal is depressed. Accordingly, driving at an optimum deceleration can be more consistently realized. Therefore, when maintaining a large fleet of such golf cars 1, effectiveness of the brakes of the golf cars 1 can be made more uniform.

Figure 2:
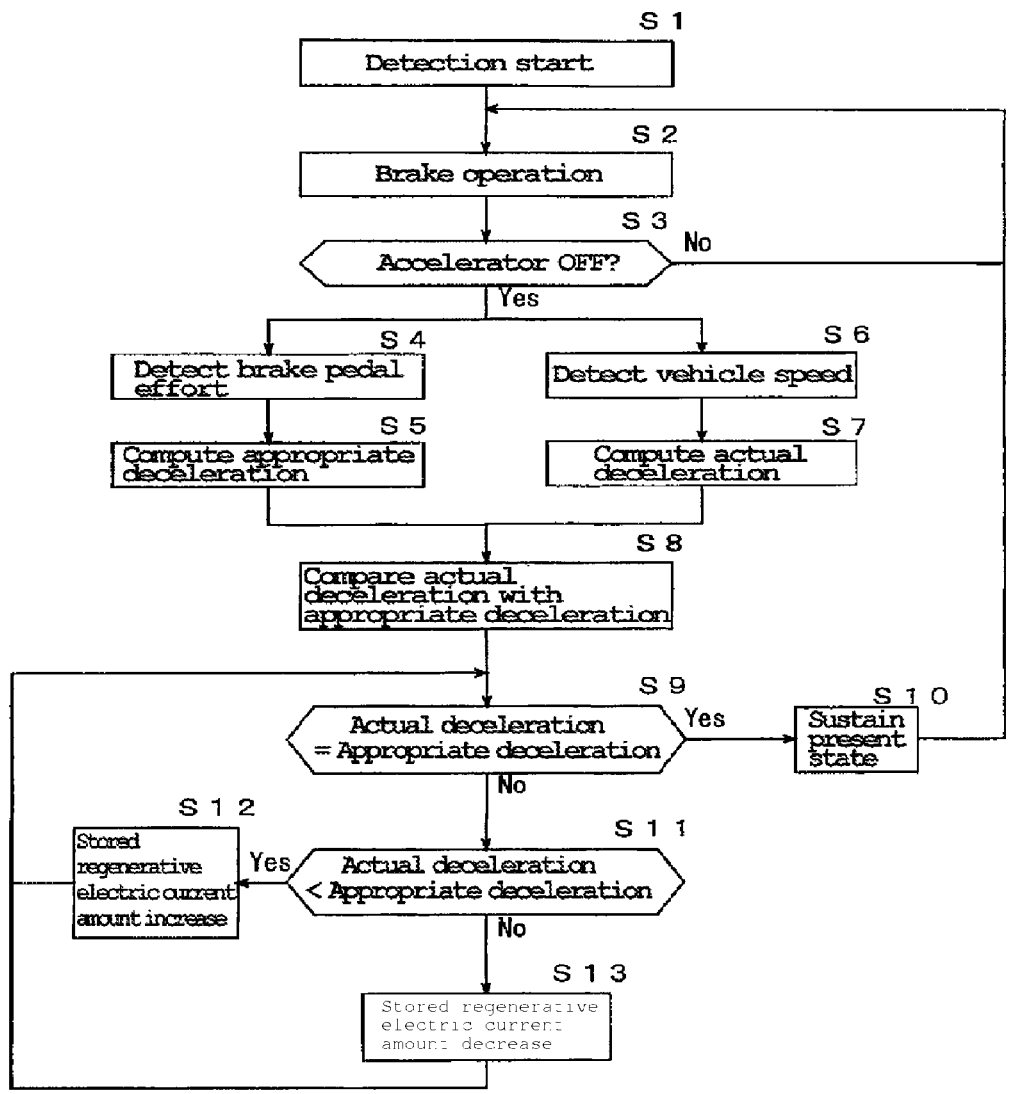
FIG. 2 is a flowchart of a braking force correcting method that can be used with the electric golf car shown schematically in FIG. 1.

FIG. 2 is a flowchart of a braking force correcting method that can be used with the electric golf car discussed above.

When the golf car is being operated, the MCU starts detection of a braking event so that a desire of braking force correction can be evaluated (S1). While monitoring for detecting a braking event (S2), the MCU monitors the accelerator position, the brake pedal load (or position), and the vehicle speed.

When a user operates the brake while driving the golf car, the braking operation is made by depressing the brake pedal. The brake operation is not limited to depressing the brake pedal, but may be made by any other action useful for actuating a brake mechanism used in the golf car. Therefore, the "brake pedal effort" is not limited to a force used to depress the brake, but can also represent an operation amount used during brake operation.

When the brake is operated, the accelerator opening detection device determines if the accelerator is OFF (e.g., a state where the accelerator pedal is not being used) or not (S3). If the accelerator is ON (e.g., a state where the accelerator pedal is being depressed), the actual deceleration cannot be accurately determined due to the motive power of the electric motor. Thus, the method continues to monitor for brake actuation without the accelerator being ON (S2, S3).

If the accelerator is OFF, the brake pedal effort detection device detects a brake pedal effort (S4). The expected deceleration then can be obtained from the brake pedal effort input through a computation (i.e., the expected deceleration computation process) (S5). As described above, the expected deceleration is the expected deceleration value of the vehicle that would correspond to the effort applied to the brake pedal when the brakes have not significantly worn and when the brake system does not have a significant abnormality.

The vehicle speed detection device detects a speed of the vehicle simultaneously with detecting the brake pedal effort (S6). The actual deceleration of the vehicle is obtained by a computation from the speed of the vehicle input (the actual deceleration computing step) (S7). The actual deceleration is a value indicating how much a speed of the vehicle has decreased after a certain period passed.

A comparison (S8) is made between the expected deceleration obtained (S5) and the actual deceleration obtained (S7). A determination is made whether the actual deceleration is equal to the expected deceleration or not (S9). If the actual deceleration is equal to the expected deceleration, a present braking force is sufficient (S10), the braking force is not corrected, and the present state is sustained. The method or routine then continues to monitor for another brake application (S2).

If the actual deceleration differs from the expected deceleration (S9), a determination is made about if the actual deceleration is lower than the expected deceleration or not (S11). If the actual deceleration is lower than the expected deceleration, the mechanical braking is less effective than desired. Thus, an amount of regenerative electric current supplied to the battery is increased, and thereby a braking force is increased (S12). Duty control is used to turn ON or OFF a voltage applied to the gate of the FET such that the battery and the motor can be connected and disconnected. Thus, the amount of regenerative electric current can be increased. The increase in braking force is continued until the actual deceleration corresponds with the expected deceleration.

If the actual deceleration is higher than the expected deceleration (S11), it is determined that excessive braking force is being applied. Therefore, an amount of regenerative electric current supplied to the battery is reduced, and thereby a braking force of the vehicle can be adjusted (S13). In other words, the duty control turns ON or OFF a voltage applied to the gate of the FET so that an amount of regenerative electric current returning to the battery is reduced. The reduction in braking force is continued until the actual deceleration corresponds with the expected deceleration.

As described above, if the actual deceleration does not correspond with the expected deceleration, an amount of regenerative electric current is adjusted by duty control. Therefore, the effectiveness of the brakes of the vehicle can more consistent over time. In some embodiments, the actual deceleration can be obtained by computation and can be compared to a predicted deceleration, and thereby a determination can be made whether the vehicle is not braking at the expected deceleration. Therefore, application of the method is not limited to deterioration of brake mechanisms, and so forth, but can be used with any braking mechanism installed in a vehicle to account for reductions in braking force due to abnormalities, for instance. Since an amount of regenerative electric current is adjusted by duty control to the FET, a braking force correction with regenerative electric current can be employed with a simple control mechanism. Further, when maintaining a large number of golf cars, effectiveness of the brake does not differ significantly between each vehicle. Therefore, an optimally comfortable ride can be consistently realized.

Although the present invention has been described in terms of a certain embodiment, other embodiments apparent to those of ordinary skill in the art also are within the scope of this invention. Thus, various changes and modifications may be made without departing from the spirit and scope of the invention. For instance, various components may be repositioned as desired. Moreover, not all of the features, aspects and advantages are necessarily required to practice the present invention. Accordingly, the scope of the present invention is intended to be defined only by the claims that follow.

What is claimed is:

1. A braking force correcting method for an electric golf car comprising a battery, the method comprising:
    checking an accelerator opening to determine if an accelerator opening is zero;
    detecting a speed of the golf car and obtaining an actual deceleration;
    detecting a demand level for brake application and obtaining an expected deceleration at the detected demand level;
    if the accelerator opening is determined to be zero, a comparison is made between the actual deceleration and the expected deceleration, and if the actual deceleration is lower than the expected deceleration, an amount of regenerative electric current supplied to the battery is increased so that the actual deceleration increases toward the expected deceleration; and
    if the accelerator opening is determined not to be zero, no comparison is made between the actual deceleration and the expected deceleration and the amount of regenerative electric current supplied to the battery is not increased.

2. The method according to claim 1, wherein, if the actual deceleration is higher than the expected deceleration, the amount of regenerative electric current supplied to the battery is reduced so that the actual deceleration decreases toward the expected deceleration.

3. An electric golf car comprising:
    an accelerator opening detection device configured to detect operator demand for movement of the golf car by checking an accelerator opening to determine if the accelerator opening is zero;
    a vehicle speed detection device configured to detect an operating speed of the golf car and to obtain an actual deceleration;
    a brake pedal effort detection device configured to detect operator demand for stopping of the golf car by detecting a demand level for brake application and obtaining an expected deceleration at the detected demand level; and
    a microcomputer configured to compute the actual deceleration and the expected deceleration and configured to compare the actual deceleration with the expected deceleration; wherein
    the accelerator opening detection device and the brake pedal effort detection device are connected to the microcomputer;
    the microcomputer is connected to a regenerative electric current amount adjusting device that is configured to change an amount of regenerative electric current supplied to the battery;
    if the accelerator opening detection device determines that the accelerator opening is zero and if the microcomputer determines that the actual deceleration is lower than the expected deceleration, the microcomputer increases the amount of regenerative electric current supplied to the battery so that the actual deceleration increases toward the expected deceleration; and
    if the accelerator opening detection device determines that the accelerator opening is not zero, the microcomputer does not compare the actual deceleration with the deceleration and does not change the amount of regenerative electric current supplied to the battery.

4. An electric golf car, the golf car comprising:
    an accelerator opening detection device configured to detect operator demand for movement of the golf car by checking an accelerator opening to determine if the accelerator opening is zero;
    a vehicle speed detection device configured to detect an operating speed of the golf car and to obtain an actual deceleration;
    a brake pedal effort detection device configured to detect operator demand for stopping of the golf car by detecting a demand level for brake application and obtaining an expected deceleration at the detected demand level; and a microcomputer configured to compute the actual deceleration and the expected deceleration and configured to compare the actual deceleration with the expected deceleration; wherein the accelerator opening detection device and the brake pedal effort detection device are connected to the microcomputer;

the microcomputer is connected to a regenerative electric current amount adjusting device that is configured to change an amount of regenerative electric current supplied to the battery;

if the accelerator opening detection device determines that the accelerator opening is zero and if the microcomputer determines that the actual deceleration is lower than the expected deceleration, the microcomputer increases the amount of regenerative electric current supplied to the battery so that the actual deceleration increases toward the expected deceleration;

if the accelerator opening detection device determines that the accelerator opening is zero and if the microcomputer determines that the actual deceleration is higher than the expected deceleration, the microcomputer decreases the amount of regenerative electric current supplied to the battery so that the actual deceleration decreases toward the expected deceleration; and if the accelerator opening detection device determines that the accelerator opening is not zero, the microcomputer does not compare the actual deceleration with the expected deceleration and does not change the amount of regenerative electric current supplied to the battery.

* * * * *